United States Patent [19]

Sakurai et al.

[11] 4,376,720

[45] Mar. 15, 1983

[54] OLEFIN POLYMERIZATION CATALYST AND OLEFIN POLYMERIZATION METHOD USING SUCH CATALYST

[75] Inventors: Hisaya Sakurai; Yoshihiko Katayama; Tadashi Ikegami; Shigeo Tsuyama, all of Kurashiki, Japan

[73] Assignee: Asahi Kasei Kogyo Kabushiki Kaisha, Osaka, Japan

[21] Appl. No.: 211,991

[22] Filed: Dec. 1, 1980

[30] Foreign Application Priority Data

Dec. 4, 1979 [JP] Japan .................................. 54-156347
Mar. 18, 1980 [JP] Japan .................................. 55-33364

[51] Int. Cl.$^3$ .......................... C08F 4/66; C08F 10/02
[52] U.S. Cl. ................................. 252/430; 252/429 B; 252/429 C; 526/105; 526/126
[58] Field of Search ................ 252/429 B, 430, 429 C

[56] References Cited

U.S. PATENT DOCUMENTS 2,023,153 5/1979 Eve .
3,989,878 11/1976 Aishima et al. ................. 252/429 B
4,027,089 5/1977 Aishima et al. ................. 252/429 B
4,146,549 3/1979 Aishima et al. ................. 252/429 B
4,146,695 5/1977 van de Leemput .

FOREIGN PATENT DOCUMENTS 2023153 12/1979 United Kingdom .

Primary Examiner—Jacqueline V. Howard
Attorney, Agent, or Firm—Sprung, Horn, Kramer & Woods

[57] ABSTRACT

An olefin polymerization catalyst which shows an extremely high activity even at low temperatures and is suited for the production of blow molding polymers, said catalyst comprising a solid component constituted by a chromium compound supported by an inorganic oxide carrier, and an organomagnesium complex compound soluble in the inert hydrocarbons and represented by the general formula: $M_\alpha Mg_\beta R_p^1 R_q^2 R_r^3 X_s Y_t$ (wherein $\alpha > 0$, $\beta > 0$, $p \geq 0$, $q \geq 0$, $r \geq 0$, $s > 0$, $t \geq 0$, $0 < (s+t)/(\alpha+\beta) \leq 1.5$ and $p+q+r+s+t = m\alpha + 2\beta$; M is an atom selected from the group consisting of aluminum, zinc, boron, beryllium and lithium; m is the valence of M; $R^1$, $R^2$ and $R^3$ may be same or different and represent respectively a hydrocarbon radical having 1 to 20 carbon atoms; X is $OSiR^5R^6R^7$; and Y is a radical selected from the group consisting of $OR^4$, $OSiR^5R^6R^7$, $NR^8R^9$ and $SR^{10}$, wherein $R^5$, $R^6$, $R^7$, $R^8$ and $R^9$ represent respectively a hydrocarbon radical or hydrogen atom, and $R^4$ and $R^{10}$ represent a hydrocarbon radical).

17 Claims, No Drawings

OLEFIN POLYMERIZATION CATALYST AND OLEFIN POLYMERIZATION METHOD USING SUCH CATALYST

This invention relates to an olefin polymerization catalyst used for the polymerization of olefins, particularly ethylene or ethylene and other α-olefins, and an olefin polymerization method using such catalyst. More particularly, the invention relates to a novel and high-activity olefin polymerization catalyst composed of a combination of a solid component comprising a chromium compound supported by an inorganic oxide and a component containing a specific organomagnesium compound.

The ethylene polymerization catalysts obtained by calcining the chromium compounds such as chromium oxide supported by an inorganic oxide carrier such as silica, silica-alumina, etc., are widely known as "Phillips catalysts".

In use of such catalysts, however, both the catalytic activity and the average molecular weight of the produced polymer greatly depend on the polymerization temperature, and in order to produce the polymers having a commercially required range of molecular weight, or of the order of tens of thousands to hundreds of thousands, while maintaining a sufficiently high catalyst activity, it was generally necessary to keep the polymerization temperature within the range of 100° to 200° C. When the polymerization is carried out in such temperature range, the produced polymer stays dissolved in the reaction solvent, so that the viscosity of the reaction system rises excessively, giving rise to various problems such as increased difficulty in recovering the polymerization product, and thus it was hardly possible to elevate the produced polymer concentration to higher than 20%. Strong request has therefore been voiced for the development of a catalyst which shows a high activity at the polymerization temperature of below 100° C. suited for performing the so-called slurry polymerization. Further, it has become an important requirement recently to dispense with the catalyst removal step in the process after the polymerization so as to reduce the production cost, and this has necessitated the development of a catalyst which shows a high activity and is capable of attaining the object even with a small amount.

A great many of catalyst systems comprising combinations of organoaluminum compounds, organozinc compounds, etc., have been proposed to improve the polymerization activity of said Phillips type chromium catalysts (for instance, see U.S. Pat. No. 3,081,286, British Pat. Nos. 1,241,134 and 1,398,225, and Japanese Patent Publication No. 27415/1968). Nevertheless, these proposals were insufficient to meet the request for the improvement of catalytic activity, and there still has been a strong demand for further improvement of catalytic activity. There have been also proposed the catalyst systems prepared by combining the dialkylmagnesium compounds and alkylalkoxymagnesium compounds (for instance, see U.S. Pat. Nos. 3,277,070, 4,115,318 and 4,146,695), but these catalyst systems were also unsatisfactory for the following reason: when said organometallic components are combined with an ordinary Phillips type solid component, the molecular weight of the polymer at a polymerization temperature below 100° C. proves to be too high, and also the molecular weight distribution is not sufficiently broad. Thus, further improvement of these catalyst systems for the production of commercial blow molding polymers has been desired.

The present inventors have made further researches from the above-said viewpoint and found as a result that a catalyst prepared by combining a chromium compound supported by a carrier such as silica and a specific organomagnesium compound shows an extremely high catalytic activity in the polymerization not only at a temperature above 100° C. but also at a low temperature below 100° C. and also allows easy production of a polymer having a molecular weight suited for blow molding as well as a wide molecular weight distribution, and this finding has led to the attainment of this invention.

Thus, the present invention provides a catalyst for olefin polymerization comprising:

(a) a solid component prepared from a chromium compound supported by an inorganic oxide carrier, and (b) an organomagnesium complex compound soluble in inert hydrocarbons, said complex compound being represented by the general formula: $M_\alpha Mg_\beta R_p^1 R_q^2 R_r^3 X_s Y_t$ (wherein $\alpha > 0$, $\beta > 0$, $p \geq 0$, $q \geq 0$, $r \geq 0$, $s > 0$, $t \geq 0$, $0 < (s+t)/(\alpha+\beta) \leq 1.5$, and $p+q+r+s+t = m\alpha + 2\beta$; M is an atom selected from the group consisting of aluminum, zinc, boron, beryllium and lithium; m is the valency of M; $R^1$, $R^2$ and $R^3$ represent respectively a hydrocarbon radical having 1 to 20 carbon atoms and they may be same or different; X is $OSiR^5R^6R^7$; and Y is a radical selected from the group consisting of $OR^4$, $OSiR^5R^6R^7$, $NR^8R^9$ and $SR^{10}$, wherein $R^5$, $R^6$, $R^7$, $R^8$ and $R^9$ represent respectively a hydrocarbon radical or hydrogen atom, and $R^4$ and $R^{10}$ represent respectively a hydrocarbon radical).

As apparent from the Examples and Comparative Examples given later, the catalyst of this invention comprising a combination of a carrier-supported chromium compound (solid component) and a specific organomagnesium compound is surprisingly improved in its catalytic activity; this catalyst is several times as high in catalytic activity as the known combination catalysts comprising an organoaluminum compound in combination with other compounds such as mentioned below. Also, as compared with the known combination catalysts comprising the dialkylmagnesium complex compounds containing no siloxy radical, the catalyst of this invention comprising an organomagnesium complex compound containing the siloxy radicals and metal atoms M (such as aluminum) allows production of the polymers having a high melt index which indicates an average molecular weight convenient for molding works. Such polymers also have a wide molecular weight distribution suited for blow molding. Further, the hydrocarbon solutions of the siloxy-containing organomagnesium complex compounds according to this invention show a far higher activity than the ether solutions of the so-called Grignard compounds.

There has been disclosed to date no catalyst of the type comprising a combination of a specific organomagnesium compound used in this invention, that is, a siloxy radical-containing organomagnesium complex compound soluble in hydrocarbons and a Phillips type carrier-supported chromium compound.

The present invention is now described in detail.

As the inorganic oxide carrier used in this invention, there may be employed a variety of substances such as silica, alumina, silica-alumina, thoria, zirconia, etc., but among them, silica and silica-alumina are most preferred. No specific restriction is however placed on these substances and any commercially available high-activity silica catalyst (highly porous and having a large surface area) may be used.

As for the chromium compound to be supported by said carrier, there may be cited the oxides of chromium and the compounds which form at least partially chromium oxide when calcined, such as halides, oxyhalides, nitrates, sulfates, oxalates, alcoholates, etc. More definitely, one may cite chromium trioxide, chromyl chloride, potassium dichromate, ammonium chromate, chromium nitrate, chromium acetylacetate, ditertiary butyl chromate, etc. Chromium trioxide is most preferred.

Now, supporting and calcination of the chromium compound are described.

Supporting of a chromium compound by a carrier can be accomplished by a known means such as impregnation, distilling-off of the solvent or adhesion by sublimation. The amount of chromium to be supported is within the range of 0.05 to 5%, preferably 0.1 to 3%, in terms of weight percent of the chromium atoms to the weight of the carrier.

Activation by calcination can be also attained by a known method. It is usually performed in a nonreducing atmosphere, for example in the presence of oxygen, but it is also possible to accomplish such calcination in the presence of an inert gas or under reduced pressure. It is desirable to use air which is substantially free of moisture. Such calcination is carried out at a temperature above 300° C., preferably a temperature of from 400° C. to 900° C., for a period of several minutes to several ten hours, preferably 30 minutes to 10 hours. It is recommended to perform said calcination activation under a fluidized condition in a stream of dry air at a required rate.

The catalyst system of this invention may comprise a solid component obtained by first calcining a carrier such as silica and then supporting thereon a chromium compound soluble in the non-aqueous solvents, such as t-butyl chromate, in a per se known way.

It is of course possible to concurrently use a known method for adjusting the catalytic activity or molecular weight of the formed polymer by adding a titanate or a fluorine-containing salt in the supporting or calcination step.

Illustration is now given on the siloxy radical-containing organomagnesium complex compounds soluble in the inert hydrocarbons, which compounds are represented by the general formula: $M_\alpha Mg_\beta R_p^1 R_q^2 R_r^3 X_s Y_t$ and used as a component of the catalyst of this invention. In the above-shown formula, M is an atom selected from aluminum, zinc, boron, beryllium and lithium, preferably aluminum or zinc, most preferably aluminum. $R^1$, $R^2$ and $R^3$ represent respectively a hydrocarbon radical such as an alkyl group, a cycloalkyl group or an aryl group, preferably one having 1 to 20 carbon atoms. As examples of such groups, there may be cited methyl, ethyl, propyl, butyl, amyl, hexyl, octyl, decyl, dodecyl, cyclohexyl, phenyl and the like. An alkyl group is preferably used. The ratio of Mg to M ($\beta/\alpha$), which is an important factor in this invention, is preferably not smaller than 0.5, more preferably not smaller than 1. X and Y represent a polar group. More definitely, X is a siloxy group of the general formula: $OSiR^5R^6R^7$, and Y is an alkoxy group of the general formula: $OR^4$, a siloxy group of the general formula: $OSiR^5R^6R^7$, an amino group of the general formula: $NR^8R^9$ or a sulfide group of the general formula: $SR^{10}$. Y is preferred to be an alkoxy group or a siloxy group. In the above-shown general formulae, $R^5$ to $R^9$ represent respectively hydrogen atom or a hydrocarbon radical which preferably has 1 to 15 carbon atoms, and $R^4$ and $R^{10}$ represent a hydrocarbon radical having preferably 1 to 15 carbon atoms. The ratio of the polar group to the metal atoms $(s+t)/(\alpha+\beta)$ is also an important consideration; it is preferably not greater than 1, most preferably not greater than 0.8. The ratio of the siloxy group to the metal atoms $(s/(\alpha+\beta))$ is not smaller than 0.2 but not greater than 1.5, preferably not greater than 1.0, more preferably not greater than 0.8. Fulfillment of said requirements on M and siloxy group $(OSiR^5R^6R^7)$ leads to the typical effect of this invention, particularly a satisfactory result in melt index, as shown in Examples 1–7 and Comparative Examples C and D.

Said organomagnesium complex compounds soluble in the inert hydrocarbons can be synthesized according to the methods shown in the already published applications by this applicant (for example, see U.S. Pat. Nos. 4,027,089, 4,146,549 and 3,989,878). As the inert hydrocarbon medium, one may favorably use an aliphatic hydrocarbon such as hexane or heptane, an aromatic hydrocarbon such as benzene or toluene, or an alicyclic hydrocarbon such as cyclohexane or methylcyclohexane.

The method for combining a solid catalyst component (that is, solid component comprising a chromium compound supported by a carrier and activated by calcination) and an organomagnesium component is now described.

Said both solid catalyst component and organomagnesium component may be added in the polymerization system under the prescribed polymerization conditions, or they may be combined prior to the polymerization. Alternatively, the solid catalyst component may be first treated with said organomagnesium component, then further combined with an organomagnesium compound and introduced into the polymerization system. The ratio between said both components to be combined, as calculated in terms of $(Mg+M)/Cr$, is recommended to be within the range of 0.01–3,000, preferably 0.1–100.

The method of olefin polymerization using the catalyst of this invention is now discussed.

The olefins that can be polymerized by using the catalyst of this invention are α-olefins, particularly ethylene, but the catalyst of this invention can be also used for the copolymerization of ethylene and a monoolefin such as propylene, butene-1, hexene-1, etc., or for the polymerization in the presence of a diene such as butadiene, isoprene, etc.

Copolymerization by use of the catalyst of this invention allows preparation of the polymers having a density within the range of 0.91 to 0.97 g/cm³.

As for the polymerization method, there may be employed ordinary suspension polymerization, solution polymerization or vapor phase polymerization. In the case of suspension polymerization or solution polymerization, the catalyst is introduced into the reactor together with a polymerization solvent, for example an aliphatic hydrocarbon such as propane, butane, pentane, hexane or heptane, an aromatic hydrocarbon such as benzene, toluene or xylene or an alicyclic hydrocarbon such as cyclohexane or methylcyclohexane, and the polymerization may be carried out at a temperature ranging from room temperature to 320° C. in an inert atmosphere by charging ethylene under a pressure of 1 to 200 kg/cm². On the other hand, vapor phase polymerization can be accomplished by employing a fluidized bed or moving bed system so as to provide good contact between ethylene and catalyst, or by adopting a proper measure such as effecting mixing by stirring, at a temperature of from room temperature to 120° C. by charging ethylene under a pressure of 1 to 50 kg/cm².

The catalyst of this invention features its high performance; it shows a high activity even under the relatively low-temperature and low-pressure conditions of around 80° C. and around 10 kg/cm². In this case, since the produced polymer stays in the form of a slurry in the polymerization system, the rise of viscosity of the polymerization system is very limited. It is therefore possible to increase the polymer concentration in the polymerization system to higher than 30%, resulting in many advantages such as improved production efficiency. Also, owing to the high activity of the catalyst, it is possible to dispense with the step of removing the catalyst residue from the produced polymer.

The polymerization may be of an ordinary one-stage polymerization system using one reaction zone or may be of a multi-stage polymerization system using a plurality of reaction zones. The polymers produced by using the catalyst of this invention, even when using an ordinary one-stage polymerization system, have a wide molecular weight distribution and are also relatively high in molecular weight, so that they can be favorably used for blow molding or film molding. In case of using a multi-stage polymerization system where the polymerization is carried out under two or more different reaction conditions, there can be produced the polymers having an even wider molecular weight distribution.

It is of course possible to employ the known techniques such as adjustment of the polymerization temperature, addition of hydrogen into the polymerization system or addition of an organometallic compound which is apt to induce chain transfer, for the purpose of controlling the molecular weight of the polymer produced. It is also possible to perform the polymerization by incorporating other suitable techniques such as addition of a titanates for the adjustment of density and/or molecular weight.

Shown hereinbelow are the examples of this invention, but it is to be understood that the scope of this invention is not limited in any way by these examples.

The term "catalytic activity" used in the following Examples signifies the amount (g) of the polymer produced per one gram of chromium in the solid catalyst per one hour of the polymerization under the monomer pressure of 10 kg/cm². "M.I." stands for the melt index measured according to ASTM D-1238 at a temperature of 190° C. under a load of 2.16 kg. "F.R." is the quotient given by dividing the value of high-load melt index measured at 190° C. under the load of 21.6 kg by the above-defined M.I. This F.R. is known to the artisans as an index for indicating the broadness of molecular weight distribution.

EXAMPLE 1

(1) Synthesis of solid component (a)

0.4 G of chromium trioxide was dissolved in 80 ml of distilled water, and in this solution was immersed 20 g of silica (Grade 952, produced by Fuji Davison Co.), the solution being stirred at room temperature for one hour. The formed slurry was heated to evaporate away water and then dried at 120° C. under reduced pressure for 10 hours. The resultantly formed solid was calcined at 800° C. in the stream of dry air for 5 hours to obtain a solid component (a). This solid component (a) contained 1% by weight of chromium, and it was stored at room temperature in a nitrogen atmosphere.

(2) Synthesis of organomagnesium component (b)

13.80 G of di-n-butylmagnesium and 6.81 g of an organoaluminum compound having the composition of $Al(C_2H_5)_{1.50}(OSi.H.CH_3.C_2H_5)_{1.50}$ were put into a 500 ml flask together with 200 ml of n-heptane and they were reacted at 80° C. for 2 hours to synthesize a siloxy-containing organomagnesium complex solution having the composition of $AlMg_{0.3}(C_2H_5)_{1.5}(n-C_4H_9)_{6.0}(OSi.H.CH_3.C_2H_5)_{1.50}$.

(3) Polymerization

20 Mg of the solid component (a) synthesized as described in (1) above, 0.1 mmol of the siloxy-containing organomagnesium complex solution (0.1 mmol calculated in terms of organic metals (Mg+Al)) synthesized as described in (2) above and 0.8 liters of dehydrated and deoxidated hexane were supplied into a 1.5-liter-capacity autoclave of which the interior had been vacuumized and replaced with nitrogen. The internal temperature of the autoclave was maintained at 80° C. and ethylene was added to a parital pressure of 10 kg/cm², followed by addition of hydrogen to build up an overall pressure of 14 kg/cm². While maintaining the overall pressure at 14 kg/cm² by supplying ethylene, said materials were polymerized for 2 hours to obtain 240 g of a polymer. The catalytic activity was 600,000 g-polymer/g-Cr/hr, and M.I. and F.R. of the polymer were 0.30 and 135, respectively.

Comparative Example A

The process of Example 1 was repeated but by using 0.1 mmol of triethylaluminum instead of 0.1 mmol of the organomagnesium complex. The results of the polymerization were as follows. Polymer yield: 60 g; catalytic activity: 150,000 g-polymer/g-Cr/hr; M.I.: 0.25; F.R.: 140.

Comparative Example B

The process of Example 1 was repeated but by using 0.1 mmol of n-butylmagnesium chloride (di-n-butyl ether solution) instead of 0.1 mmol of the organomagnesium complex (heptane solution), obtaining the following results. Polymer yield: 40 g; catalytic activity: 100,000 g-polymer/g-Cr/hr; M.I.: lower than 0.01.

Comparative Example C

The process of Example 1 was repeated but by using 0.1 mmol of a dialkylmagnesium complex (heptane solution) having the composition of $AlMg_6(n-C_4H_9)_{12}(C_2H_5)_3$ instead of 0.1 mmol of the siloxy radical-containing organomagnesium complex (heptane solution) to obtain the following results. Polymer yield: 220 g; catalytic activity: 550,000 g-polymer/g-Cr/hr; M.I.: lower than 0.01.

Comparative Example D

The process of Example 1 was repeated but by using 0.1 mmol of dibutylmagnesium having the composition of $(sec-C_4H_9)Mg(n-C_4H_9)$ (heptane solution, produced by Lithium Corporation of America) instead of 0.1 mmol of the siloxy radical-containing organomagnesium complex (heptane solution). The polymerization gave the following results. Polymer yield: 208 g; catalytic activity: 520,000 g-polymer/g-Cr/hr; M.I.: lower than 0.01.

EXAMPLES 2-6

The polymerization of Example 1 was carried out by changing the organomagnesium component and its amount to obtain the results shown in Table 1 below.

TABLE 1

| Example No. | Organomagnesium component | Amount used (Mg + Al) (mmol) | Catalytic activity (g/g-Cr/hr) | M.I. |
|---|---|---|---|---|
| 1 | $AlMg_3(C_2H_5)_{1.5}(n\text{-}C_4H_9)_{6.0}(OSi.H.CH_3.C_2H_5)_{1.5}$ | 0.1 | 600,000 | 0.30 |
| 2 | $AlMg_6(C_2H_5)(n\text{-}C_4H_9)_{12}(OSi.CH_3.CH_3.C_2H_5)_2$ | 0.05 | 595,000 | 0.30 |
| 3 | $AlMg(iso\text{-}C_4H_9)_2(n\text{-}C_6H_{13})_2(OSi.H.CH_3.n\text{-}C_4H_9)$ | 0.4 | 640,000 | 0.40 |
| 4 | $AlMg_2(C_2H_5)_{1.6}(n\text{-}C_4H_9)_{2.4}(OSi.H.CH_3.n\text{-}C_4H_9)_{3.0}$ | 0.2 | 510,000 | 0.41 |
| 5 | $Al_2Mg(C_2H_5)_2(n\text{-}C_6H_{13})_{1.5}(OSi.H.CH_3.C_2H_5)_{4.5}$ | 0.5 | 505,000 | 0.45 |
| 6 | $AlMg_4(C_2H_5)_{1.7}(n\text{-}C_4H_9)_{6.4}(n\text{-}C_{10}H_{21})_{0.9}(OSi.H.CH_3.C_2H_5)_2$ | 0.1 | 520,000 | 0.33 |

EXAMPLE 7

13.80 g of di-n-butylmagnesium and 2.85 g of triethylaluminum were put into a 500 ml flask along with 200 ml of n-heptane and reacted at 80° C. for 2 hours to synthesize 125 mmol of an organomagnesium complex solution (125 mmol calculated in terms of organic metals (Mg+Al)) having the composition of $AlMg_4(C_2H_5)_3(n-C_4H_9)_8$. To this solution was added methylhydropolysiloxane having a viscosity of 50 centistokes at 30° C. in an amount of 125 mmol based on Si, and the mixed materials were reacted at 80° C. for 2 hours to synthesize a siloxy-containing organomagnesium complex solution having the composition of $AlMg_4(C_2H_5)_{1.64}(n-C_4H_9)_{4.36}(OSi.H.CH_3.C_2H_5)_{1.3-6}(OSi.H.CH_3.n-C_4H_9)_{3.64}$. Polymerization was carried out in the same way as Example 1 by using said siloxy-containing organomagnesium complex solution as the organomagnesium component, obtaining the following results. Polymer yield: 230 g; catalytic activity: 575,000 g-polymer/g-Cr/hr; M.I.: 0.40; F.R.: 128.

EXAMPLES 8-15

The polymerization of Example 1 was carried out by changing the organomagnesium component and its amount, obtaining the results shown in Table 2. The alkoxy group was introduced by reacting a corresponding alcohol with the organometallic compounds.

EXAMPLE 16

The catalyst synthesis and polymerization were performed in the same way as Example 1 except that 1.6 g of chromium nitrate nonahydrate was used instead of 0.4 g of chromium trioxide in the synthesis of the solid component (a). The results of the polymerization were as follows. Polymer yield: 236 g; catalytic activity: 590,000 g-polymer/g-Cr/hr; M.I.: 0.29.

EXAMPLE 17

The polymerization of Example 1 was carried out but by using an ethylene and butene-1 mixed gas (containing 15 mol% of butene-1) instead of ethylene, and isobutane as polymerization solvent instead of hexane, at a temperature of 80° C. under mixed gas partial pressure of 10 kg/cm$^2$, hydrogen partial pressure of 1 kg/cm$^2$ and overall pressure (including solvent vapor pressure) of 23 kg/cm$^2$ and by using the catalyst of Example 1. There were obtained the following results of polymerization. Polymer yield: 216 g; catalytic activity: 540,000 g-polymer/g-Cr/hr; M.I.: 0.63; polymer density: 0.924.

What is claimed is:

1. A catalyst for olefin polymerization comprising:
   (a) a solid component comprising a chromium compound supported by an inorganic oxide carrier, and
   (b) an organomagnesium complex compound soluble in inert hydrocarbons, said compound being represented by the general formula: $M_\alpha Mg_\beta R_p^1 R_q^2 R_r^3 X_s Y_t$ (wherein $\alpha>0$, $\beta>0$, $p\geq 0$, $q\geq 0$, $r\geq 0$, $s>0$, $t\geq 0$, $0<(s+t)/(\alpha+\beta)\leq 1.5$, and $p+q+r+s+t=m\alpha+2\beta$; M is an atom selected from the group consisting of aluminum, zinc, boron, beryllium and lithium; m is the valence of M; $R^1$, $R^2$ and $R^3$ may be same or different and represent respectively a hydrocarbon radical having 1 to 20 carbon atoms; X is $OSiR^5R^6R^7$; and Y is a group selected from $OR^4$, $OSiR^5R^6R^7$, $NR^8R^9$ and $SR^{10}$, wherein $R^5$, $R^6$, $R^7$, $R^8$ and $R^9$ represent respec-

TABLE 2

| Example No. | Organomagnesium component | Amount used (Mg + M) (mmol) | Catalytic activity (g/g-Cr/hr) | M.I. |
|---|---|---|---|---|
| 8 | $AlMg_3(n\text{-}C_4H_9)_3(OSi.H.CH_3.n\text{-}C_4H_9)_3(On\text{-}C_6H_{13})_3$ | 0.3 | 520,000 | 0.60 |
| 9 | $AlMg(n\text{-}C_4H_9)_{2.7}(iso\text{-}C_3H_7)_{0.9}(OSi.H.CH_3.n\text{-}C_4H_9)_{1.0}(On\text{-}C_4H_9)_{0.4}$ | 0.1 | 610,000 | 0.50 |
| 10 | $Al_2Mg(C_2H_5)_{3.6}(n\text{-}C_4H_9)_{0.9}(sec\text{-}C_4H_9)_{0.9}(OSi.H.CH_3.C_2H_5)_{2.0}(OC_2H_5)_{0.6}$ | 0.2 | 535,000 | 0.53 |
| 11 | $ZnMg_2(C_2H_5)_{1.7}(n\text{-}C_4H_9)_{3.4}(OSi.H.CH_3.C_2H_5)_{0.3}(OSi.H.CH_3.n\text{-}C_4H_9)_{0.6}$ | 0.15 | 550,000 | 0.36 |
| 12 | $ZnMg(n\text{-}C_4H_9)_{2.4}(OSi.H.CH_3.n\text{-}C_4H_9)_{1.6}$ | 0.2 | 585,000 | 0.42 |
| 13 | $BMg(n\text{-}C_4H_9)_{4.2}(OSi.CH_3.CH_3.n\text{-}C_4H_9)_{0.8}$ | 0.2 | 510,000 | 0.34 |
| 14 | $BeMg_5(C_2H_5)_{1.9}(C_6H_{13})_{9.9}\{OSi(C_6H_5)_3\}_{0.2}$ | 0.5 | 510,000 | 0.30 |
| 15 | $LiMg(n\text{-}C_4H_9)_{1.8}(sec\text{-}C_4H_9)_{0.9}\{OSi(C_6H_5)_3\}_{0.3}$ | 0.4 | 520,000 | 0.27 | tively a hydrocarbon radical or hydrogen atom, and $R^4$ and $R^{10}$ represent a hydrocarbon radical).

2. The catalyst of claim 1, wherein the inorganic oxide carrier is selected from the group consisting of silica, silica-alumina and alumina.

3. The catalyst of claim 1, wherein the inorganic oxide carrier is silica.

4. The catalyst of claim 1, wherein the solid component (a) is calcined.

5. The catalyst of claim 4, wherein the calcination is performed in a non-reducing atmosphere.

6. The catalyst of claim 1, wherein the chromium compound is chromium trioxide or a compound which forms at least partially chromium oxide by the calcination.

7. The catalyst of claim 1, wherein in the general formula of the organomagnesium complex compound (b), $\beta/\alpha \geq 0.5$.

8. The catalyst of claim 1, wherein in the general formula of the organomagnesium complex compound (b), $\beta/\alpha \geq 1$.

9. The catalyst of claim 1, wherein in the general formula of the organomagnesium complex compound (b), M is selected from the group consisting of aluminum, zinc and lithium.

10. The catalyst of claim 1, wherein in the general formula of the organomagnesium complex compound (b), M is aluminum or zinc.

11. The catalyst of claim 1, wherein in the general formula of the organomagnesium complex compound (b), M is aluminum.

12. The catalyst of claim 1, wherein in the general formula of the organomagnesium complex compound (b), X is $OSiR^5R^6R^7$ and Y is $OR^4$ or $OSiR^5R^6R^7$.

13. The catalyst of claim 1, wherein in the general formula of the organomagnesium complex compound (b), $0 < (s+t)/(\alpha+\beta) \leq 1$.

14. The catalyst of claim 1, wherein in the general formula of the organomagnesium complex compound (b), $0 < (s+t)/(\alpha+\beta) \leq 0.8$.

15. The catalyst of claim 1, wherein in the general formula of the organomagnesium complex compound (b), $0.2 \leq s/(\alpha+\beta) \leq 1.5$.

16. The catalyst of claim 1, wherein in the general formula of the organomagnesium complex compound (b), $0.2 \leq s/(\alpha+\beta) \leq 1$.

17. The catalyst of claim 1, wherein in the general formula of the organomagnesium complex compound (b), $0.2 \leq s/(\alpha+\beta) \leq 0.8$.

* * * * *